E. E. ANDREWS.
PUMP.
APPLICATION FILED MAY 1, 1919.

1,365,647.

Patented Jan. 18, 1921.

Inventor
Edward E. Andrews
by Chas. F. Perkins Attorney

UNITED STATES PATENT OFFICE.

EDWARD E. ANDREWS, OF WINCHESTER, MASSACHUSETTS, ASSIGNOR TO CHAPMAN MANUFACTURING COMPANY, A CORPORATION OF MASSACHUSETTS.

PUMP.

1,365,647.     Specification of Letters Patent.     Patented Jan. 18, 1921.

Application filed May 1, 1919. Serial No. 294,122.

*To all whom it may concern:*

Be it known that I, EDWARD E. ANDREWS, a citizen of the United States, residing at Winchester, in the county of Middlesex and State of Massachusetts, have invented new and useful Improvements in Pumps, of which the following is a specification.

My invention relates to pumps, and particularly to motor actuated automobile tire pumps.

The object of my invention is to provide a more convenient, efficient, durable, and economical pump of the class above mentioned, at a lower cost of manufacture than heretofore experienced in the manufacture of similar devices, and I accomplish this object by the employment in combination of a novel piston packing ring of wood, soaked with lubricating substance and a floating ring retaining expansion plate.

A recognized requisite of an efficient tire pump is means for the exclusion of oil from the cylinder pressure chamber, as the introduction of lubricating matter to the interior of the tire is highly detrimental to the inner tube and shoe fabric. By the employment of a packing ring of wood, impregnated with oil or other suitable lubricating substance, I prevent the presence of any excess of oil in the cylinder pressure chamber, and at the same time provide sufficient lubrication of the piston. A ring of the material described need not fit the cylinder so accurately as a metal ring, as it is expanded more readily and to a greater degree as the pressure in the cylinder chamber, and thus on the ring retaining expansion plate, is increased, with the result that the greatest efficiency is automatically attained at the moment when most required, that is when the pump is doing the heaviest work; the increased friction resulting from the closer contact with the chamber wall being offset by the more efficient lubrication which results from the greater expansion and closer contact. Thus I eliminate the expense which ordinarily attends that degree of refinement of manufacture necessitated by the employment of metal throughout the piston. Furthermore the wooden ring is more durable and economical, having longer life at less initial cost.

Figure 1:
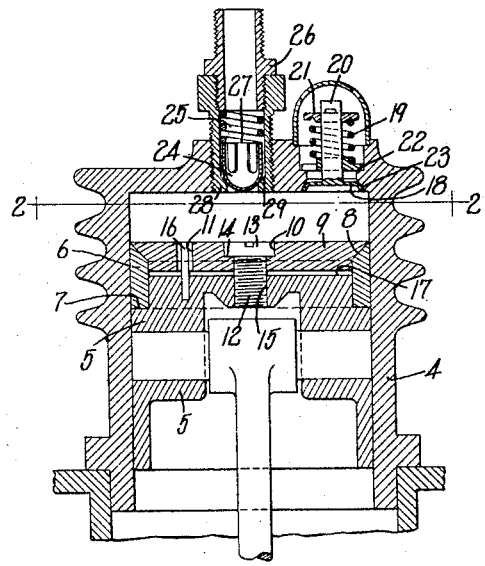
Figure 2:
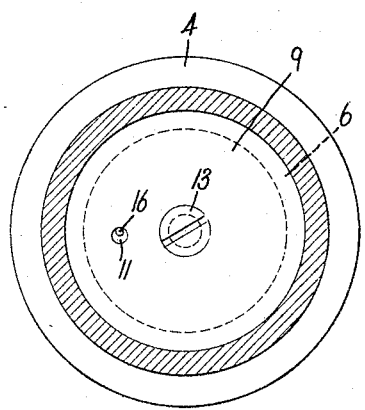
Figure 3:
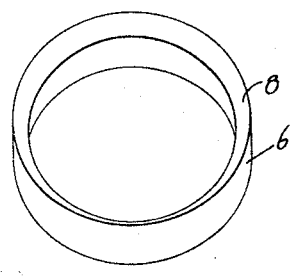

My invention further resides in the novel construction and relation of parts, hereinafter more fully described and claimed, and shown in the drawing accompanying this specification, in which Figure 1 is a vertical diametrical section of my improved pump; Fig. 2 is a plan of the piston head, and Fig. 3 a perspective of the piston ring.

Referring to the drawing, 4 is the cylinder and 5 the piston base. 6 is an unsplit piston ring adapted to fit upon the shoulder 7 of the base 5. The ring 6 is formed of wood, and is provided with a beveled top edge 8. 9 is a floating expansion plate beveled at its periphery to match the beveled edge 8 of the ring 6 and provided with the central aperture 10 and the eccentric aperture 11. 12 is a bolt adapted to engage the aperture 10 the head 13 of which bolt is adapted to bear against the shoulder 14 of the aperture 10 and the screw threaded extremity of which bolt is adapted to engage the screw threaded aperture 15 in the base 5 and thus retain the base, the ring 6 and the plate 9 in operative relation. Mounted in the base 5 is a pin 16 of less diameter than the aperture 11 and adapted to protrude through the latter and prevent rotative movement of the plate 9 beyond a limited degree by contact with the periphery of the aperture 11 and also to allow the expansion plate to find its own center. The relative dimensions of the ring 6 and the projection of the base 5 beyond the shoulder 7 are such that a substantial space is provided between the top surface 17 of the base and the under surface of the plate 9.

In assembling the piston base 5, ring 6 and expansion plate 9, the bolt 12 is screwed down sufficiently to exert a slight pressure upon the ring. In operation this pressure will be increased as the pressure in the chamber and thus on the plate 9 is increased thus expanding the ring farther and effecting a closer contact with the cylinder wall during the inflation stroke. This automatic variation of the fit between piston and cylinder results in a most efficient pump, the parts being in their most efficient operative relation during the period when the most exacting demand is made upon the apparatus. The increase in friction resulting from the closer contact between ring and cylinder also operates to effect more ample lubrication, thus offsetting the disadvantage arising from the increased friction.

While my improved pump is especially adapted to the purpose specified, I do not limit myself to this application, as its novel features may be advantageously embodied in other types of pump.

What I claim and desire to secure by Letters Patent is:

1. A piston of the character described provided with a self lubricating packing ring of wood having a smooth unbroken exterior surface, the pores of said ring being uniformly impregnated with a lubricating substance.

2. A piston for a tire pump provided with a packing ring of wood uniformly impregnated with a lubricant sufficiently limited in quantity to prevent presence of oil in the cylinder pressure chamber.

3. A piston of the character described provided with a self lubricating packing ring of wood having a smooth unbroken exterior surface, the pores of said ring being uniformly impregnated with a lubricating substance, and a floating ring retaining expansion plate.

In testimony whereof I have hereunto set my hand in presence of two subscribing witnesses, this 18th day of April, 1919.

EDWARD E. ANDREWS.

Witnesses:
 THEO. W. KERR,
 CARROLL L. PERKINS.